United States Patent [19]
Futschik et al.

[11] Patent Number: 5,673,987
[45] Date of Patent: Oct. 7, 1997

[54] COMBINATION DISPLAY UNIT AND DISPLAY METHOD FOR A MOTOR VEHICLE

[75] Inventors: Dieter Futschik, Gechingen; Norbert Weber, Bondorf, both of Germany

[73] Assignee: Mercedes-Benz AG, Germany

[21] Appl. No.: 703,128

[22] Filed: Aug. 26, 1996

[30] Foreign Application Priority Data

Sep. 2, 1995 [DE] Germany .................. 195 32 427.7

[51] Int. Cl.⁶ .................................................. G01D 11/28
[52] U.S. Cl. .................................. 362/23; 362/29
[58] Field of Search ........................... 362/23, 29

[56] References Cited

U.S. PATENT DOCUMENTS 3,091,214  5/1963  Hoffman ........................ 362/29

FOREIGN PATENT DOCUMENTS

| | | |
|---|---|---|
| 0 041 741 B1 | 12/1981 | European Pat. Off. . |
| 0 351 259 | 1/1990 | European Pat. Off. . |
| 40 31 870 A1 | 4/1992 | Germany . |
| 5-24462 | 2/1993 | Japan . |
| 2 278 320 | 11/1994 | United Kingdom . |

Primary Examiner—Carroll B. Dority
Attorney, Agent, or Firm—Evenson, McKeown, Edwards & Lenahan P.L.L.C.

[57] ABSTRACT

A combination display unit and a display method for a motor vehicle, with a primary display element and at least one secondary display element for indicating and displaying various regularly-detected operating parameters. The user is informed visually by a change in the optical display of the secondary display element in question that a critical operating parameter value has been reached. Only the primary display element, serving for speed display, or areas thereof is illuminated with an increased basic brightness. The secondary display elements or areas thereof are illuminated with the basic brightness during normal operation, while the secondary display element in question or areas thereof is/are likewise illuminated with increased basic brightness when a critical operating parameter value is reached.

5 Claims, 4 Drawing Sheets

COMBINATION DISPLAY UNIT AND DISPLAY METHOD FOR A MOTOR VEHICLE

BACKGROUND AND SUMMARY OF THE INVENTION

The invention relates to a combination display unit and a display method for a motor vehicle with a primary display element and at least one secondary display element to indicate various regularly-detected operating parameters, in which one of the displays changes optically when a critical operating parameter is detected.

A combination display unit of the type generally described above is already known from European Patent Document EP 0 041 741 B1, especially FIGS. 5 and 6, in which a primary display element indicating the speed, as well as various secondary display elements (e.g. tachometer display, fuel level display, temperature display, etc.) for showing and indicating various regularly detected operating parameters during normal operation are displayed on an equal basis during normal operation. On the other hand, the reaching of a critical operating parameter is communicated to the user visually by an increase in the size of the display of the corresponding secondary display element.

It is considered disadvantageous in this regard that both the primary display element and the secondary display elements are shown to the user on an equal basis during normal operation. As a result, the driver can be distracted from events on the road by the resultant visual and informational overstimulation. Moreover, when a critical operating parameter value is displayed, it is disadvantageous that free space must be reserved for increasing the size of the representation of the secondary display element in question, or that secondary display elements that show normal operating parameter values are overwritten or blocked out; as a result, problem-free reading of these secondary display elements is no longer possible.

Japanese Patent Document JP 5-24 462 teaches a display device for a motor vehicle in which secondary displays with reduced brightness are used.

It is also known from DE 40 31 870 A1 that the reaching of critical parameter values can be indicated by flashing of the display or by a change in color, for example.

The goal of the invention is to improve a combination display unit according to the type generally described above in such fashion that overstimulation of the user by many displays during normal operation is avoided, while the critical operating parameter value is signaled to the user in critical cases without adversely affecting secondary display elements that show normal operating parameter values.

This and other goals have been achieved according to the present invention by providing a combination display unit for a motor vehicle comprising a primary display element and at least one secondary display element to indicate and to display various regularly-detected operating parameters, wherein at least one area of the primary display element is illuminated with an increased basic brightness and during normal operation at least one area of the secondary display element is illuminated with a basic brightness and when a critical value of one of said operating parameters is detected at least one area of the corresponding secondary element is additionally illuminated with said increased basic brightness. According to the invention, this goal is achieved by virtue of the fact that all secondary display elements are illuminated with a basic brightness during normal operation, and only the primary display element showing the vehicle speed is illuminated with an increased basic brightness.

This and other goals have also been achieved according to the present invention by providing a method for displaying a plurality of operating parameters of a motor vehicle on a combination display unit having a primary display element and at least one secondary display element, said method comprising the steps of: detecting said operating parameters; illuminating at least one area of the primary display element with an increased basic brightness; illuminating at least one area of the secondary display element with a basic brightness during a normal operation; and illuminating at least one area of the secondary display element with said increased basic brightness when a critical value of one of said operating parameters is detected.

Consequently, it is possible for the user to determine the most important information, namely the vehicle speed, without being distracted by other display elements. Similarly, it is also possible for the user to obtain other information as well if desired (for example, the level in the fuel tank). When critical operating parameter values appear, the user is automatically informed by the secondary display element in question likewise being illuminated with increased basic brightness. However, it is still possible for the user to read all the other display elements if desired.

Examples of possible critical operating parameter values that must be displayed include the level in the fuel tank being in the reserve range and the cooling water temperature no longer being in the safe operating range.

Reasonable operation of the motor vehicle with regard to fuel consumption, exhaust emissions, and protection of the engine is indicated in the light of general environmental impact, so that a departure from the optimum rpm range can also be viewed as a critical operating parameter value. Therefore, an indication is provided to the user that he has left the optimum rpm range and that a shifting maneuver (for manual transmissions) should be initiated.

In addition, the user of an automatic transmission with manual shifting capability can be informed by the increased basic brightness of the secondary element (tachometer) that the transmission is in the manual shift mode. During normal automatic operation, the secondary element is illuminated only with the basic brightness.

Other objects, advantages and novel features of the present invention will become apparent from the following detailed description of the invention when considered in conjunction with the accompanying drawings.

DETAILED DESCRIPTION OF THE DRAWINGS

Figure 1:
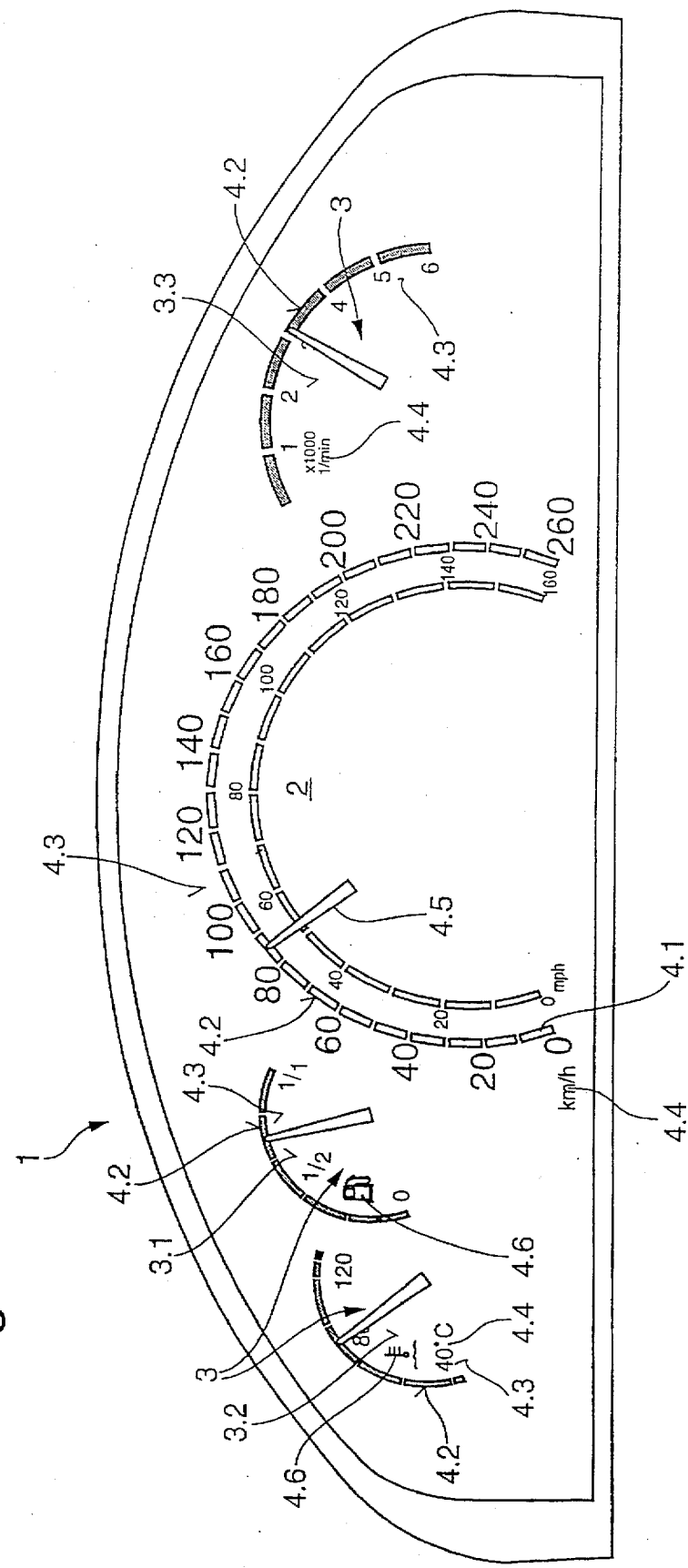
FIG. 1 is a schematic diagram of a combination display unit according to a preferred embodiment of the present invention, with the primary display element shown with increased basic brightness.

As can be seen from FIG. 1, the combination display unit 1 consists of a primary display element 2 (speedometer) and various secondary display elements 3, such as a secondary display unit for indicating the level in fuel tank 3.1, a coolant temperature display 3.2, and tachometer display 3.3.

The visual appearance of primary display element 2 and secondary display element 3 consists of a strip area 4.2 in the shape of a segment of a circle and composed of individual lined and/or marked areas 4.1, a scaling area 4.3 with numbers arranged in the shape of a segment of a circle, a measuring unit area 4.4 for displaying the measuring unit, a pointer area 4.5, and, if necessary, a symbol area 4.6 for showing the symbol that characterizes the display element.

In this embodiment, symbol area 4.6 is eliminated from secondary display element 3 which includes a ratio indication on measuring unit area 4.4 tachometer display 3.3. Symbol area 4.6 is likewise eliminated when showing primary display element 2.

FIG. 1 shows an embodiment during normal operation in which all the areas of primary display element 2 as well as scaling area 4.3, measurement units area 4.4, symbol area 4.6, and pointer area 4.5 are illuminated with increased basic brightness in secondary display elements 3, as shown by the unshaded elements. Only strip areas 4.2 of secondary display elements 3 are illuminated with basic brightness, as shown by the shaded elements.

However, a number of different display possibilities for normal operation are contemplated. Thus, for example, just symbol area 4.6 could be illuminated with increased basic brightness in secondary display element 3, or all the areas of secondary display element 3 could be illuminated only with basic brightness.

Figure 2:
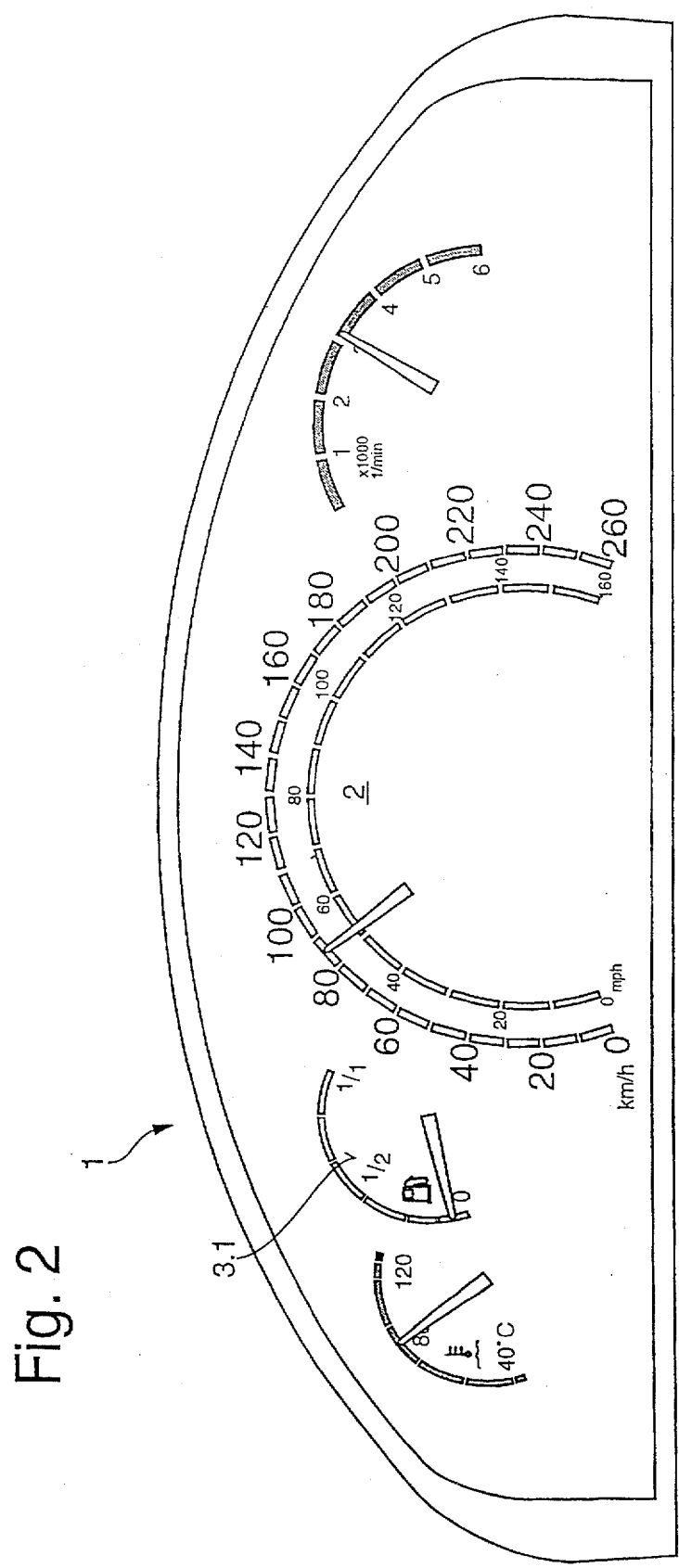
FIG. 2 shows the combination display unit according to FIG. 1 but with a secondary display unit likewise shown with increased basic brightness.

As can be seen from FIG. 2, when a critical operating parameter value is reached, all the areas of the corresponding secondary display element 3.1, like primary display element 2, are illuminated with increased basic brightness. If several operating parameters reach their critical values, several secondary display elements 3 will be displayed with increased basic brightness.

Figure 3:
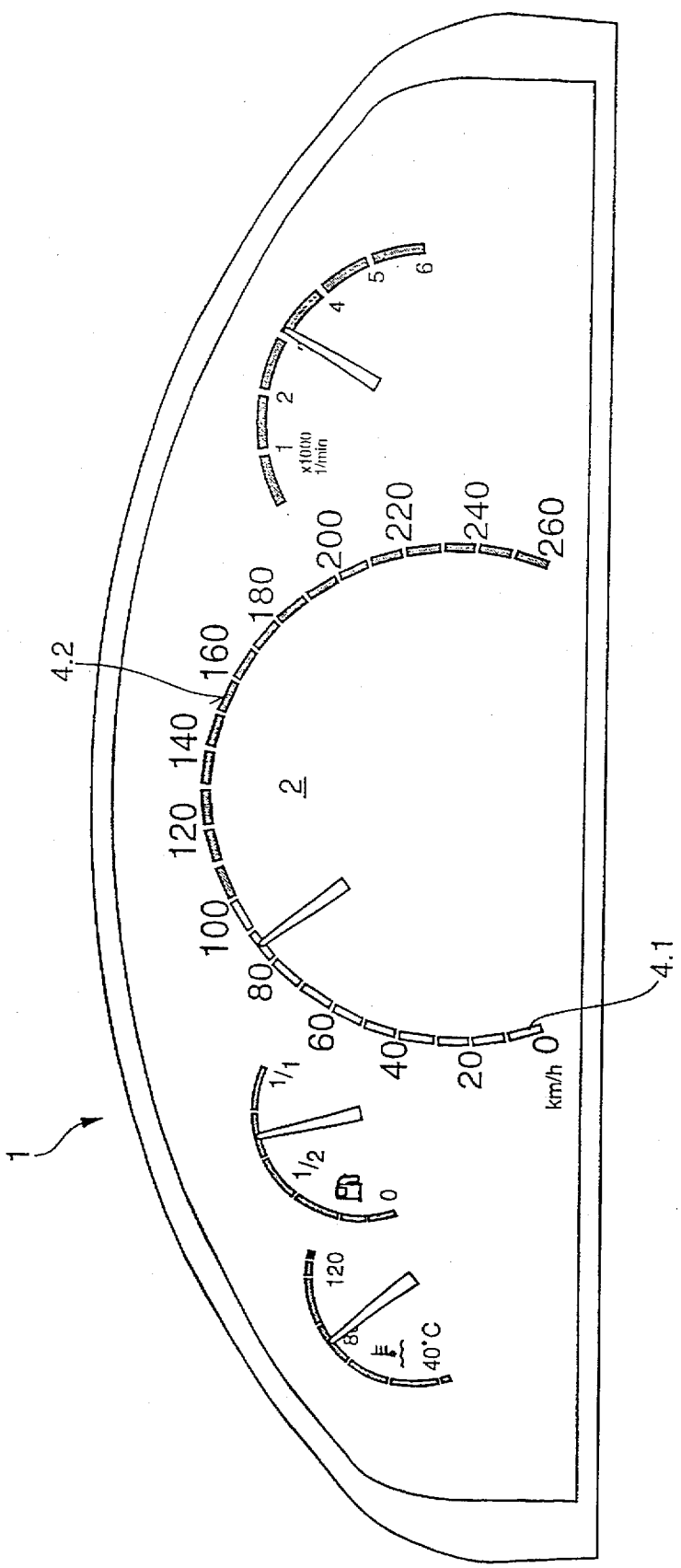
FIGS. 3 and 4 show schematically the combination display unit with the marked areas of the primary display element shown with increased and basic brightness.
Figure 4:
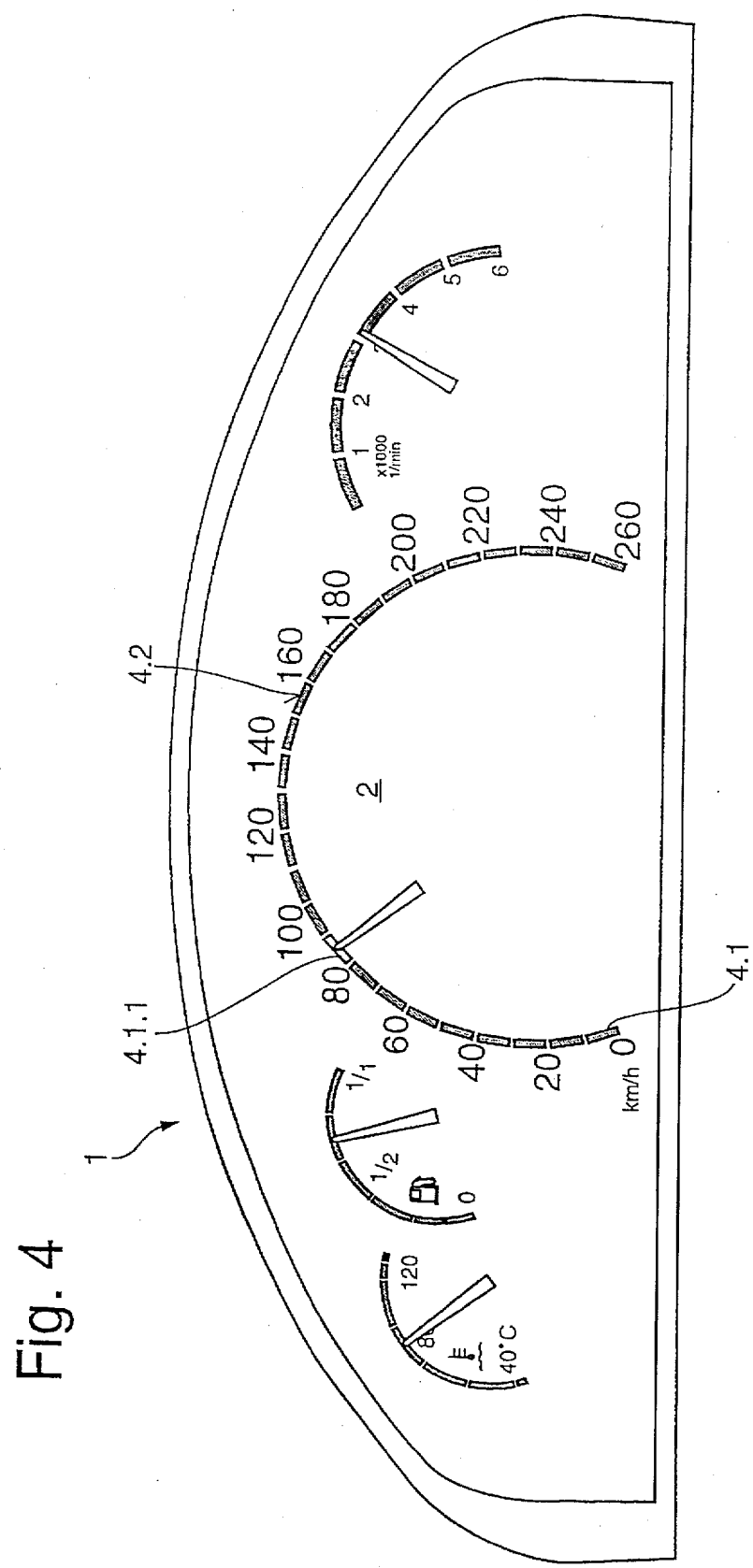

FIGS. 3 and 4 show examples of combination display unit 1 during normal operation with a speed-linked additional function turned on, with not all the areas of primary display element 2 being illuminated with increased basic brightness.

Thus, FIG. 3 shows a type of display or combination display unit 1 with the speed limit function switched on. With this function, the individual unit areas 4.1 of the set speed (in this case, 100 km/h) up to the maximum possible maximum (in this case, 260 km/h) in strip area 4.2 are illuminated with basic brightness. All other areas of primary display element 2 are illuminated with increased basic brightness. The occurrence of a critical operating parameter value is indicated by reference to the description for FIG. 2 above.

Additional possible speed-linked functions that are contemplated include the cruise control function and the minimum-distance cruise control function.

Thus, during normal operation with the cruise control switched on, the marking areas 4.1 from the lowest value (in this case, 0 km/h) of strip area 4.2 up to the set speed is illuminated with basic brightness. All other areas of primary display element 2 are illuminated with increased basic brightness.

FIG. 4 shows one embodiment of the combination display unit 1 with the minimum-distance cruise control function switched on. With this function, all of the individual marking areas 4.1, except marking area 4.1.1 that corresponds to the speed determined, are illuminated with basic brightness. All the other areas of primary display element 2 are illuminated with increased basic brightness. Indication of the occurrence of a critical operating parameter value is analogous to the description for FIG. 2.

The cruise control and speed limit function can likewise be displayed similarly to the description for FIG. 4. Then the range of markings 4.1.1, illuminated with increased basic brightness, corresponds to the set speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Combination display unit for a motor vehicle comprising a primary display element; and at least one secondary display element to indicate and to display various regularly-detected operating parameters, wherein at least one area of the primary display element is illuminated with an increased basic brightness and during normal operation at least one area of the secondary display element is illuminated with a basic brightness, and when a critical value of one of said operating parameters is detected at least one area of the corresponding secondary display element is additionally illuminated with said increased basic brightness.

2. Combination display unit according to claim 1, wherein said primary display element is a speedometer.

3. Combination display unit according to claim 2, wherein at least one area of the primary display element is illuminated with said increased basic brightness and at least one area is illuminated with said basic brightness, depending on at least one speed-linked additional function.

4. Method for displaying a plurality of operating parameters of a motor vehicle on a combination display unit having a primary display element and at least one secondary display element, said method comprising the steps of:

detecting said operating parameters;

illuminating at least one area of the primary display element with an increased basic brightness;

illuminating at least one area of the secondary display element with a basic brightness during a normal operation; and illuminating at least one area of the secondary display element with said increased basic brightness when a critical value of one of said operating parameters is detected.

5. Method according to claim 4, further comprising the step of illuminating at least one area of the primary display element with said increased basic brightness an at least one area with said basic brightness depending on at least one speed-linked additional function.

* * * * *